United States Patent Office
3,512,735
Patented May 19, 1970

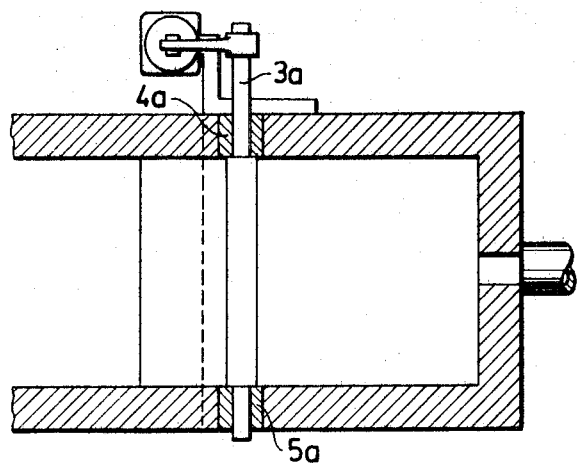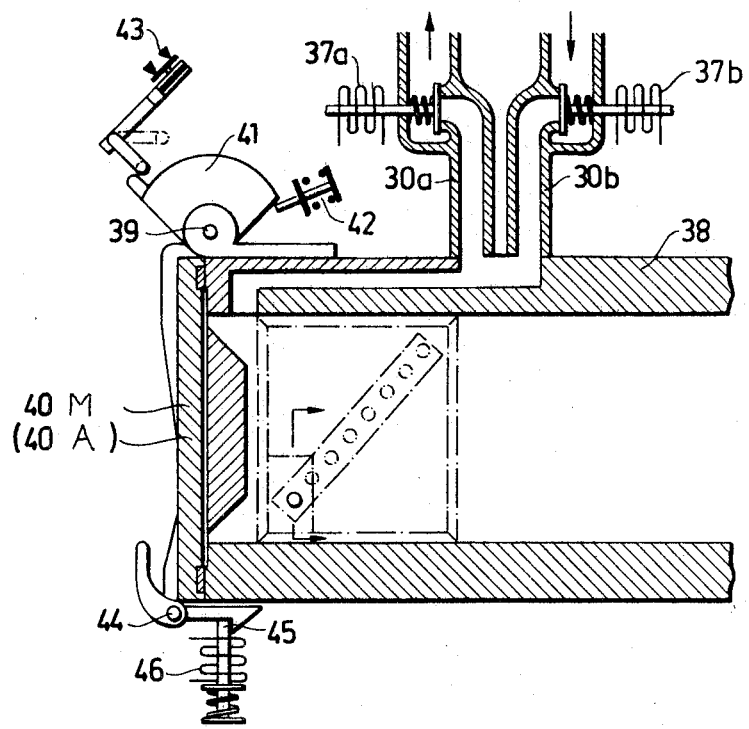

3,512,735
CONVEYING SYSTEM FOR CONTAINERS
Olof Henrik Hallstrom, Stockholm, Sweden, assignor to AB Centralsug, Johanneshov, Sweden, a corporation of Sweden
Filed Feb. 29, 1968, Ser. No. 709,326
Int. Cl. B65g 51/22, 51/32
U.S. Cl. 243—16                                   4 Claims

ABSTRACT OF THE DISCLOSURE

A conveyor system for pneumatically conveying containers through a duct system. The containers have flat top and bottom walls as well as side walls which are perpendicular to the top and bottom walls. The duct system has intersecting vertical and horizontal ducts, and the arrangement is such that the containers remain upright throughout the entire system.

---

The present invention relates to a conveying system, in which pneumatically driven containers through ducts are conveyed from one of several delivery stations to one of several receiving stations, where the containers, having a bottom and sidewalls extending therefrom, during the transportation will function as pistons in the ducts. These ducts extend mainly horizontally and vertically and are connected to one another at right angles with sharp corners and without considerable bends.

Such systems have already been proposed, for example in the form of pneumatic-tube plants, but the cylindrical containers, used in these plants, are not suitable for conveying goods, which has to be kept upright.

The main object of the present invention is to make such transport possible, for example within a hospital for conveying food portions in open dishes, bottles, test-tubes, instruments, laundry and other necessities from central stores, journals, X-ray plates and the like. The transport of goods on carriages and by means of lifts may be almost completely avoided, so that considerable reduction of the staff may be made.

According to the present invention the conveying system is mainly characterized by the fact that the bottom of the container remains in its mainly horizontal position during its transportation through the horizontal as well as the vertical ducts, that the cross-sectional dimension of the bottom is slightly smaller than the cross-sectional dimension of the vertical ducts, that the cross-sectional dimension of the sidewalls is slightly smaller than the cross-sectional dimension of the horizontal ducts and that the container is provided with tightenings or packings, adapted to tighten against the internal walls of the vertical ducts during vertical transport, as well as tightenings or packings, adapted to tighten against the internal walls of the horizontal ducts during horizontal transport.

The transport containers in the system, according to this invention, are suitably equipped with tightening means around their edges, engaging the walls of the duct. Consequently, both when the container is moving in the duct of the system in horizontal and vertical direction, the container will always function as a piston sliding in the ducts and tightening against their walls. According to one embodiment air is discharged by evacuation from the part of the duct system in front of the container (seen in the transport direction) and at the same time, air is supplied to the section of the duct system behind the container. In this way the necessary difference in pressure for the propulsion of the container, will be secured. When the direction of movement is changed, for example in transferring the container under the action of the rear, superatmospheric pressure, from a horizontal duct to a vertical duct for further displacement upwards or downwards, some kind of guiding means is required at the crossing in order to prevent the container from tilting or wedging in the duct. The guiding means may for example comprise special guiding baffles, but also other equivalent mechanical arrangements can be used. A special selecting system for directing the containers in the system may, within the frame of the invention be applied in a particularly convenient way, such as photocells.

For the sake of simplification in describing the system, a duct system, according to the invention, is illustrated on the accompanying drawings, in which the propelling of the containers is carried out exclusively by evacuating the air in front of each container and supplying compressed air behind each container.

FIG. 1 shows a right angled transition between a horizontal and a vertical duct. In the figure shown guiding baffles or screens with their operating means represent merely one of the possible arrangements for directing the containers and may for example be substituted by unfoldable guides, rolls or the like.

FIG. 2 shows a section on the line A—A in FIG. 1.

FIG. 3 illustrates a longitudinal section of a duct provided with a delivery- or receiver-door.

Figure 1:
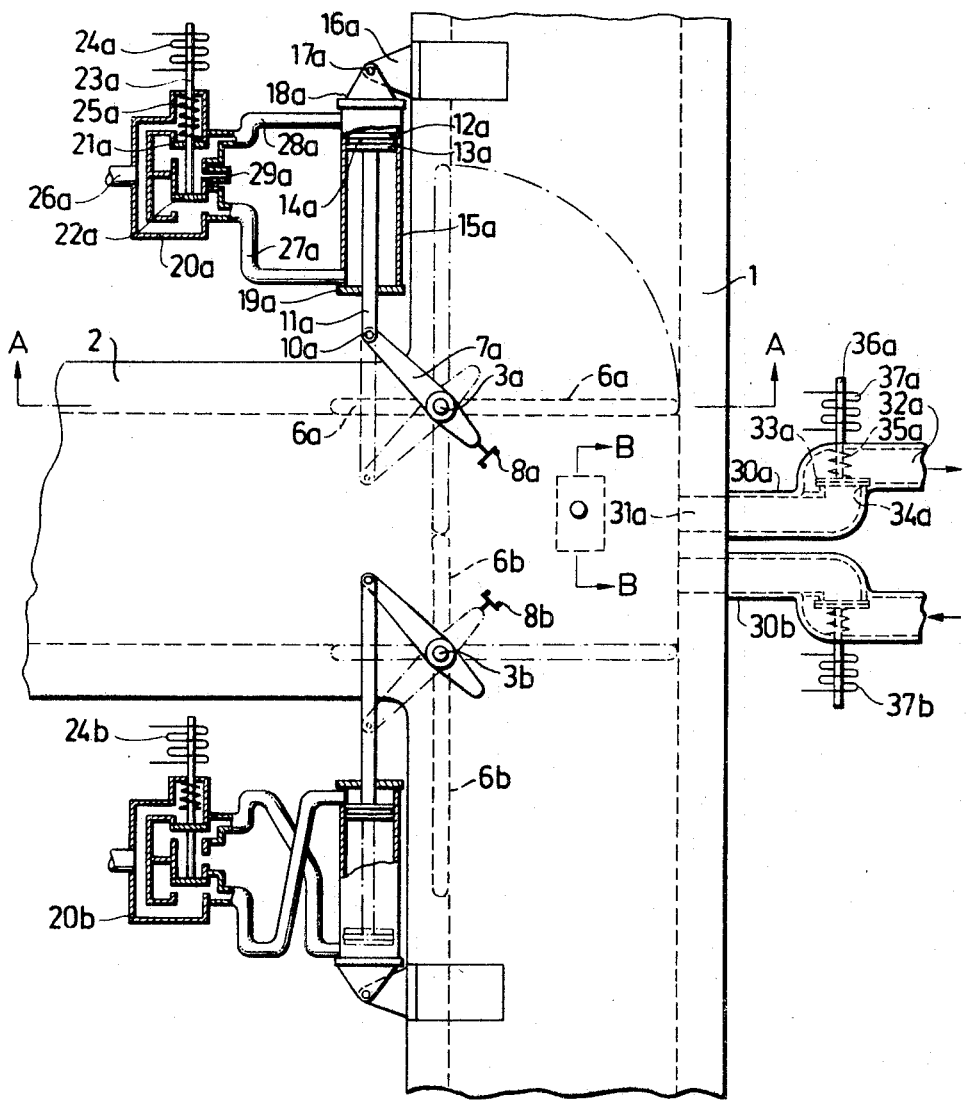

FIG. 1 illustrates an upright or vertical conveying duct 1 connected at right angles to a lying or horizontal conveying duct 2 without any considerable bending. At the intersection between the ducts pivots 3a and 3b are pivoted in fixed bushings 4a, 5a and 4b, 5b, respectively, in the duct walls. Fixed to the pivot 3a is a baffle or screen 6a and fixed to the pivot 3b is a baffle or screen 6b. The screens are mounted to rotate and have such dimensions that in their normal vertical position they will close duct 2 from duct 1, completely or partly, and when rotated by 90° around their pivots of rotation 3a, 3b said screens will elongate duct 2 into duct 1.

Mounted rigidly on the free end of pivot 3a is a double-armed lever 7a, one end of which, in the horizontal position of the screen, acts upon a current-closing switch 8a, while the opposite end of the lever is, by means of a link bolt 10a, pivotally connected with one end of a piston-rod 11a, which at its other end carries a piston 14a provided with sealing collars or sleeves 12a and 13a. The piston slides axially in a tube 15a, one end of which is shut off by means of an end piece 18a, pivotally mounted around a link bolt 17a by means of a lug 16a attached to the duct system. The opposite end of the tube 15a is closed by means of an end-piece 19a, provided with a boring and gasket around the piston-rod. A pneumatic four-way-valve 20a comprises two valve bodies 21a and 22a, fixed to a valve spindle 23 and may be caused to occupy the position shown in FIG. 1, when electric current is supplied to an electromagnetic coil 24, and the opposite (normal) position under the action of a compression spring 25a when the current is interrupted. The valve is provided with a compressed air connection 26a, connected to a supply pipe from an air compressor or the like. In the illustrated position, compressed air flows freely through a pipe 27a into the operating cylinder, which at its opposite end is vented through a pipe 28a and a discharge port 29a for the valve.

By connecting or disconnecting the current to and from the magnetical coil 24a, the screen 6a can, by means of the described arrangements, be caused to occupy horizontal position, and by connecting or disconnecting the current to and from the magnetical coil 24b in similar manner the screen 6b can be caused to occupy horizontal or vertical position. Normally, the coils are not fed with current and the screens are maintained in vertical position.

A valve 30a with its port 31a is connected to duct 1 and with its port 32a to a central evacuating system (not shown). By means of a compression spring 35a a valve body 33a is forced sealingly against a valve seat 34a and can by means of a valve stem 36a be lifted to leave free passage, when electrical current is supplied to a magnetic coil 37a, surrounding the stem. The valve is normally closed. Adjacent to the valve 30a, adapted to be opened for evacuating the system, there is arranged a similar valve 30b–37b adapted to open the connection between the duct system and the external atmosphere.

The horizontal duct 2 shown in FIG. 1 has an extension 38 as shown in FIG. 3. A hinged door 40 is adapted to seal the end of the extension, and the cam 41 of said door, in the open position of the door acting upon an electric selective switch 42 and upon a quick-breaking switch 43, but exclusively when returning from the open to the closed position and only during the last phase of the movement. A locking hook 44 is blocked by a piston 45 to prevent opening of the door 40, but not its closing, when electrical current is supplied to a magnetic coil 46, operating the piston 45.

Figure 5:
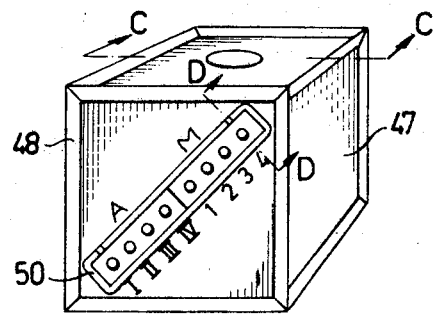
FIG. 5 shows a transport container.
Figure 6:
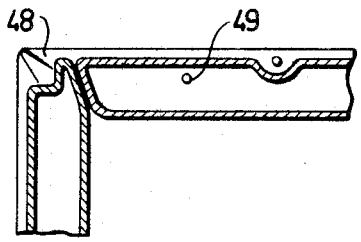
FIG. 6 shows a section on line C—C in FIG. 5.
Figure 7:
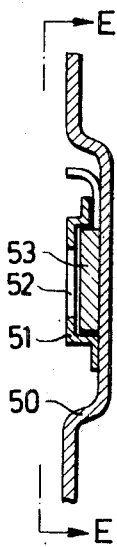
FIG. 7 illustrates a section on line D—D in FIG. 5.
Figure 8:
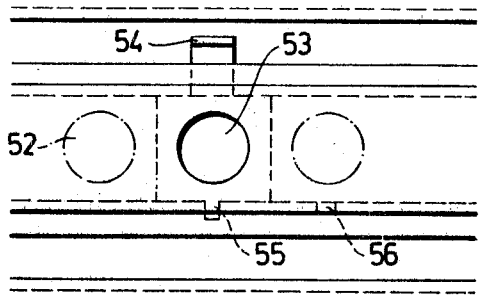
FIG. 8 shows a view on line E—E in FIG. 7.

FIGS. 5–6 show a box-like transport container 47, the sidewalls of which being equipped with strip seals 48. The container comprises a cover 49, which can be opened. At one or several sidewalls of the container there is mounted a selecting device on a section 50 countersunk below the lever of the wall. FIGS. 7–8 illustrate the selecting device, comprising a rail 51, mounted on the countersunk zone 50, which comprises a number of holes 52 corresponding to the number of delivery- and receiving-stations. Provided on the backside of the rail 51 and controlled thereof, there are two plates 53 provided with permanent magnets and adapted by means of a handle 54 to be moved and to cover those holes 52, which indicate the receiving and delivery-station, respectively. Abutments 55 for retaining plate 53 in predetermined set position interlock into the holes 56, placed in the lower section of the rail 51.

Figure 4:
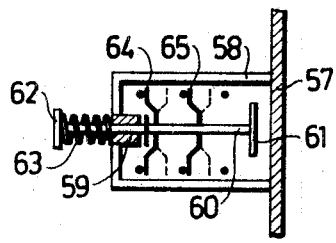
FIG. 4 shows a contact arrangement according to line B—B in FIG. 1.

FIG. 4 shows a cross-section through contact means, mounted at convenient places of the duct system for directing the transport containers. A box 58 for the contact means is fixed to the internal wall 57 of the duct system. A rod 60 is mounted displaceably in a bearing 59, on the bottom of the box 58. At one end of the rod 60 carries a soft iron armature 61 and at the opposite end there is provided a washer 62, which is actuated by the pressure from a coil spring 63, resting on the bearing 59, the result being that the two contact springs 64 and 65 secured to the rod 60 will interconnect each of a pair of contact points. When the transport box or container 47, on its way in the duct system reaches a position in which a permanent magnet 53 pre-set to the selecting device will register with the soft-iron armature 61, the latter will be attracted, and the connection between the contact springs 64 and 65 and their contact-points will be disconnected (double disconnection). By completely reversing the contact spring 65, the contact will be opened at 64 and closed at 65. If also contact spring 64 is completely reversed, contact will be closed at 64 as well as at 65 by magnetic attraction (double contact closing). All these three combinations can occur in the transport system.

Figure 9:
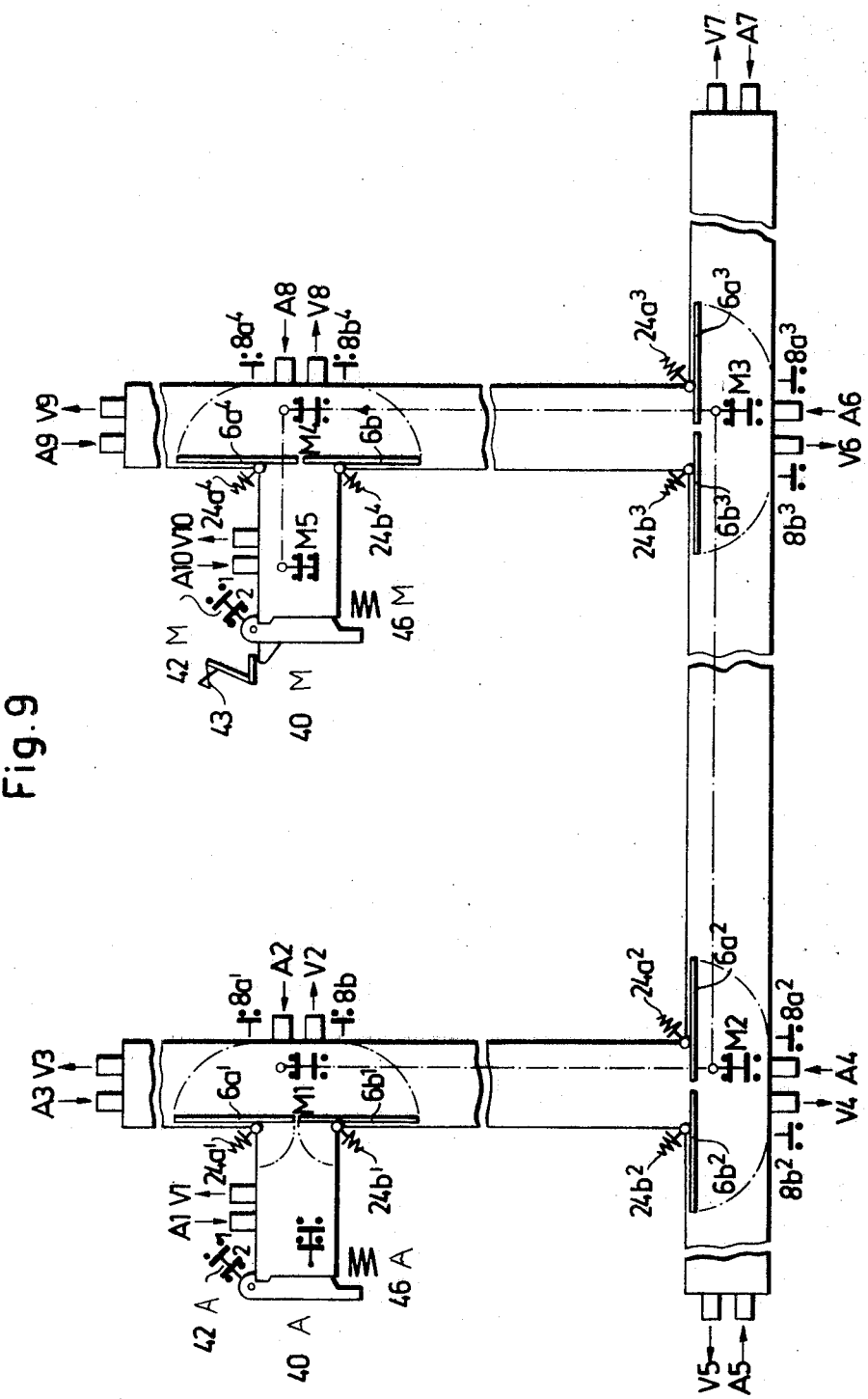
FIG. 9 shows principally a vertical section through a complete conveying system, but for the sake of simplicity only one delivery station and one receiving station are illustrated.

FIG. 9 shows a section through a complete, closed duct system comprising—for the sake of simplicity—only one delivery station (at door 40S) and one receiving station (at door 40M). There are ten valves $V_1$–$V_2$ ... $V_{10}$ for evacuation of the type 30a–37a illustrated in FIG. 1. There are ten valves $A_1$–$A_2$ ... $A_{10}$ in the shown system (FIG. 9) of the type 30b–37b, described with reference to FIG. 1, for connecting the system with the atmosphere. There are six contact devices of the type shown in FIG. 4. The first one, at the delivery station is indicated at S and the remaining valves are indicated at $M_1$–$M_2$ ... $M_5$. FIG. 9 shows their positions and their contact functions. The contact 42 operated by door 40 and shown in FIG. 3 (one closing and one disconnecting contact) is arranged on the delivery door (shown at 42A) as well as on the receiving door (indicated at 42M). The magnetic coil of the described closing mechanism is in the same way indicated at 46A and 46M, respectively.

Figure 10:
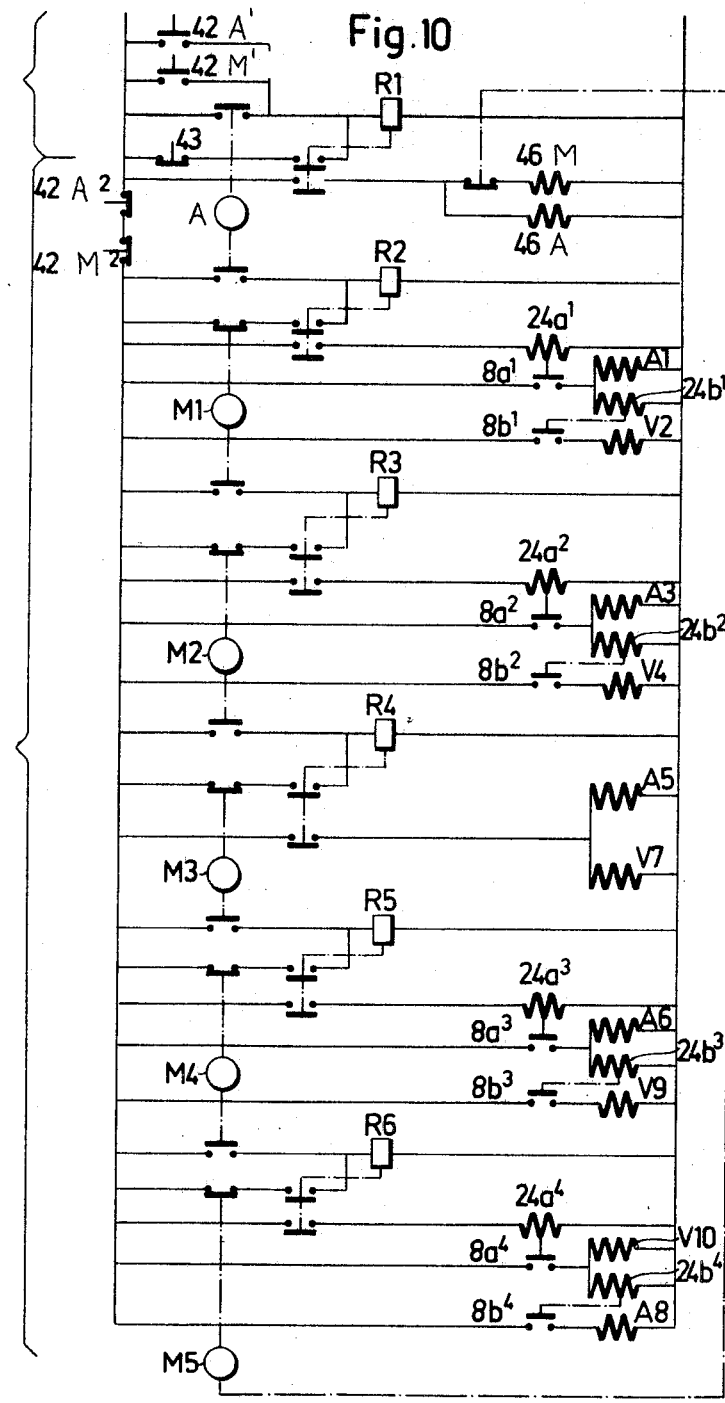
FIG. 10 shows a diagram of the system shown in FIG. 9.

FIG. 10 represents an electrical wiring diagram for the system shown in FIG. 9 and comprises, in addition to the contacts and magnetic coils illustrated in FIG. 9 also six operating relays $R_1$–$R_6$ with a dosing contact and a self-holding circuit. With reference to FIG. 9 and FIG. 10 a complete transfer of the transport container shown in FIGS. 5–8 will now be described. When opening door 40A, contact 42A' will close the current to relay $R_1$, which at contact 43 and its holding contact becomes self-holding and closes the current to locking coils 46A and 46M. All other doors are now prevented from being opened. As long as door 40A remains open, contact $42A^2$ will disconnect the entire remaining operating circuit.

A transport container is now supplied at 40A. At its selection device a permanent magnet 53 has been set in such a manner that when the container is in the starting position, it will register with contact A and a permanent magnet 53 so that at those places, where the conveying direction is changed the container will register exactly with the respective contacts $M_1$–$M_2$ ... $M_5$. Upon closing the door 40A, contact $42A^1$ will be disconnected and contact $42A^2$ closed. The two A-contacts are closed and actuated by a permanent magnet 53 and the relay $R_2$ will be energized, will become self-holding over contact $M_1$ and closes the current to coil $24a^1$, whereby the screen $6a^1$ will be set in horizontal position. Its contact $8a^1$ will be closed and the valve $A_1$ will be opened, and, when at the same time the coil $24b^1$ is supplied with current, the screen $6b^1$ will be set into horizontal position. Its contact $8b^1$ closes, and valve $V_2$ opens. The air in front of the container is sucked away through valve $V_2$ and the air through valve $A_1$ will push the container as an air piston forwards against contact $M_1$.

When the permanent magnet 53 to the receiving station 1 registers with the contact $M_1$, the latter contact will disconnect the holding circuit to relay $R_2$, whereby the screens $6a$ and $6b$ will return to vertical position, and the valves $A_1$ and $V_2$ will be closed. At the same time contact $M_1$ will activate relay $R_3$, which will get self-holding current over contact $M_2$. Relay $R_3$ closes the current for coil $24a^2$, whereby the screen $6a^2$ will be set into vertical position and will actuate contact $8a^2$, which partly opens valve $A_3$, partly closes the current for coil $24b^2$, whereby also the screen $6b^2$ is set into vertical position. It now also will act upon valve $V_4$ to open it. Through valve $A_3$ atmospheric air will flow in so as to force the container downwards against contact $M_2$. When the latter contact is actuated by permanent magnet 53, the holding circuit to relay $R_3$ will be disconnected, and the screens $6a^2$ and $6b^2$ will return to horizontal position at the same time as the valves $V_4$ and $A_3$ close.

Contact $M_2$ closes at the same time relay $R_4$, whereby the valves $V_7$ and $A_5$ will open. Atmospheric air through valve $A_5$ forces the container against contact $M_3$. When contact $M_3$ is energized by permanent magnet 53, excitation circuit to relay $R_5$ will be broken so that the valves $V_7$ and $A_5$ will close.

At the same time contact $M_3$ will close relay $R_5$, so as to energize coil $24a^3$, Screen $6a^3$ is set into vertical position and its contact $8a^3$ will open valve $A_6$ and coil $24b^3$ will be energized. Screen $6b^3$ is then set into vertical position and its contact $8b^3$ opens valve $V_9$, so that by atmospheric pressure through $A_6$ will force the container upwards against contact $M_4$. When contact $M_4$ is actuated by the permanent magnet 53, the holding circuit for relay $R_5$ is disconnected and the screens $6a^3$ and $6b^3$ are set into horizontal position and valves $V_9$–$A_6$ will be closed.

At the same time contact $M_4$ closes relay $R_6$, and coil $24a^4$ will be energized, whereby screen $6a^4$ will be set into horizontal position and its contact $8A^4$ is closed, valve $V_{10}$ is opened and coil $24b^4$ energized. Screen $64b$ is set into horizontal position, contact $8b^4$ is closed and valve $A_8$ opened and permits full passage for atmospheric air, which forces the container against contact $M_5$. When contact $M_5$ is actuated by permanent magnet 53, the holding circuit of relay $R_6$ will be interrupted. The screens $6a^4$ and $6b^4$ are set into vertical position and the valves $A_9$–$V_{10}$ are closed. At the same time contact $M_5$ disconnects the current to coil 46M, and door 40M is ready to be opened. For the reason of security contact 42M' closes the current to relay $R_1$, whereas contact $42M^2$ disconnects the remainder of the operating circuit. The container can be taken out, and when contact $M_5$ is not actuated, the current circuit is closed through coil 46M. Upon closing of door 40M contact 43 will be activated at the last part of the closing phase so that this contact spontaneously will be disconnected. The holding circuit of relay $R_1$ is interrupted and consequently all doors are unbolted.

The above description represents one form of execution as an example only. As previously mentioned, the containers may even be conveyed with the assistance of mechanical driving units on certain sections of the transport system. A transport from contact $M_2$ to contact $M_3$ would, for example be possible by means of a conveyor belt or a chain, and conveying from contact $M_4$ to contact $M_5$ may be effected by means of an operating piston, driven by compressed air, which will force the container from position $M_4$ to position $M_5$.

What I claim is:

1. Conveying system, adapted to convey pneumatically driven containers through a duct system from one of several delivery stations to one of several receiving stations, said containers comprising a bottom and sidewalls extending therefrom and functioning as pistons in the duct system during the conveying operation, said ducts extending mainly horizontally and vertically and interconnected at right angles with sharp corners without considerable bends, characterized in that the bottom of said containers remaining mainly in a horizontal position during the entire conveying operation through horizontal as well as vertical ducts, the cross-sectional dimension of said bottom being slightly smaller than the cross-sectional dimension of the vertical ducts, the cross-sectional dimension of said sidewalls being slightly smaller than the cross-sectional dimension of the horizontal ducts, said container being provided with first sealing means to tighten against the internal walls of said vertical ducts in vertical transport and with second sealing means to tighten against the internal walls of the horizontal ducts during horizontal transport, and remote-controlled means provided at the intersection between horizontal and vertical ducts for the purpose of guiding the containers in their movement to and from said vertical and horizontal ducts.

2. The combination of claim 1 and wherein a selecting device is carried by each container for selecting a given delivery station, and means coacting with the selecting device for guiding the container to the selected delivery station.

3. The combination of claim 2 and wherein said means which coacts with said selecting device is situated at an intersection between vertical and horizontal ducts for responding to the selecting device for directing a container in the ducts.

4. The combination of claim 1 and wherein each container has its walls extending at right angles to each other.

References Cited

UNITED STATES PATENTS

| | | | |
|---|---|---|---|
| 3,263,943 | 8/1966 | Share | 243—2 |
| 3,419,229 | 12/1968 | Crosby | 243—1 |

HARVEY C. HORNSBY, Primary Examiner

U.S. Cl. X.R.

243—1, 2, 19, 34, 38, 39